E. E. REAVIS.
TRANSPLANTING MACHINE.
APPLICATION FILED OCT. 12, 1912.
1,059,316.
Patented Apr. 15, 1913.
3 SHEETS—SHEET 1.
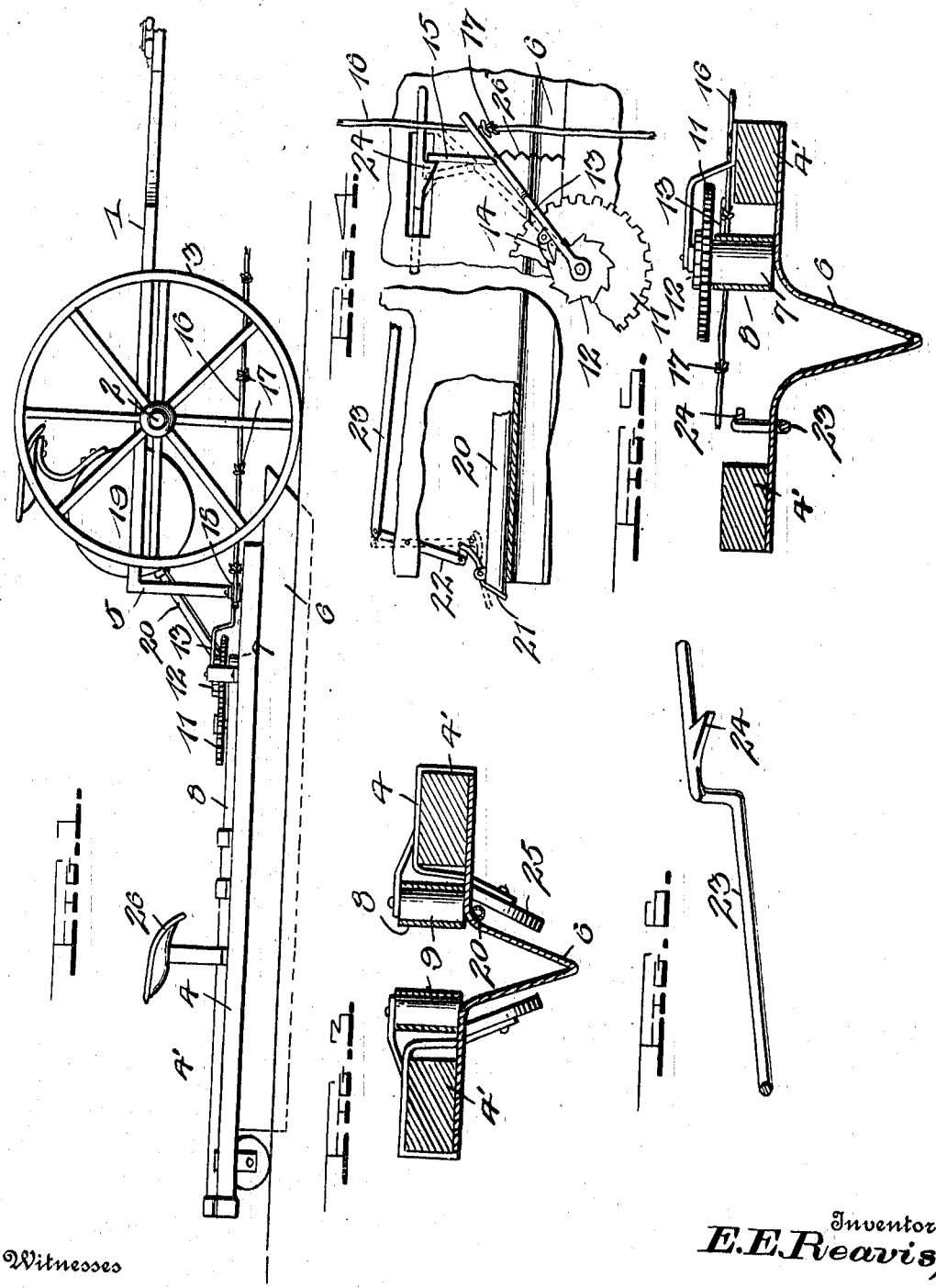
Witnesses
Inventor
E. E. Reavis,
By Watson E. Coleman
Attorney

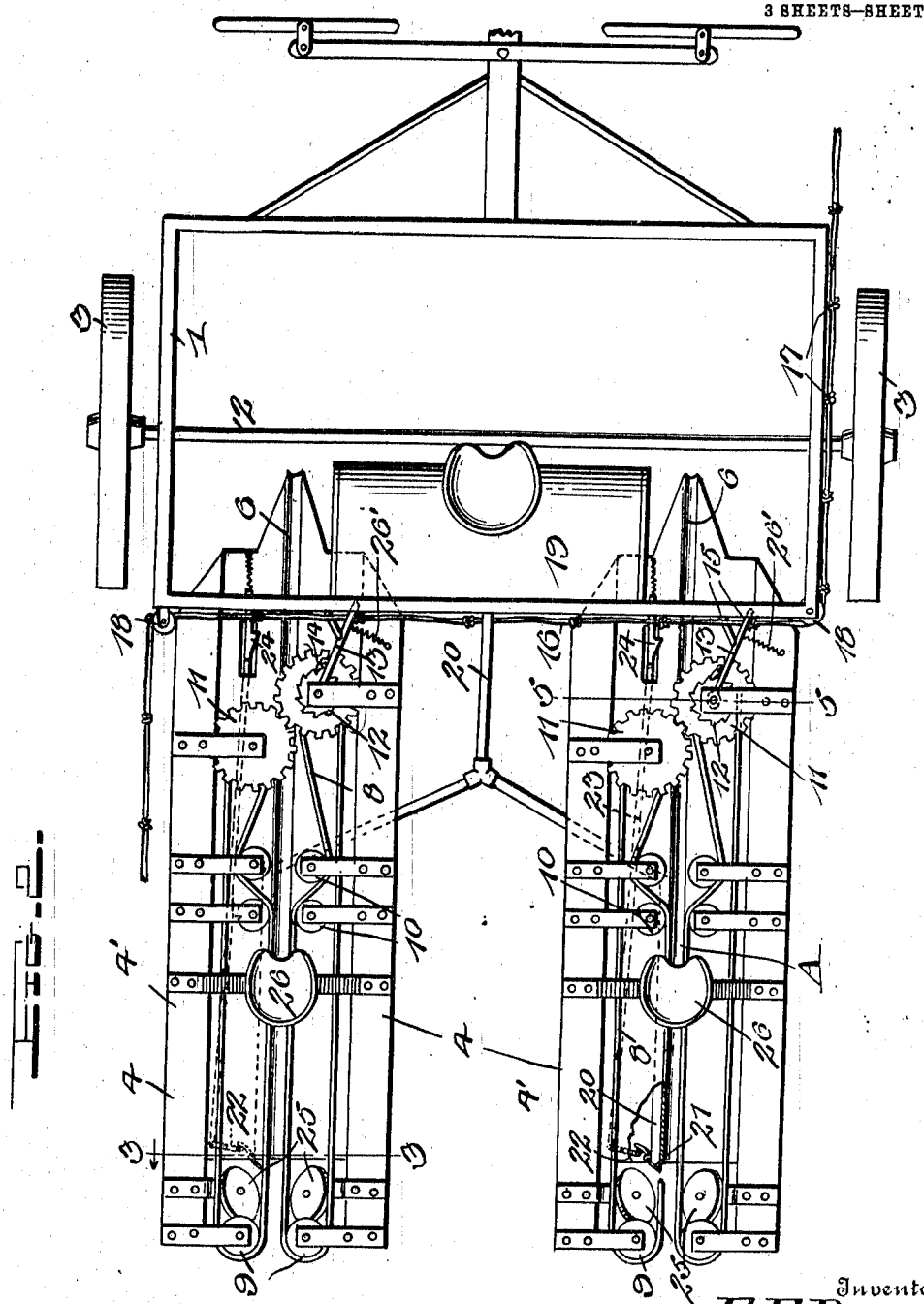

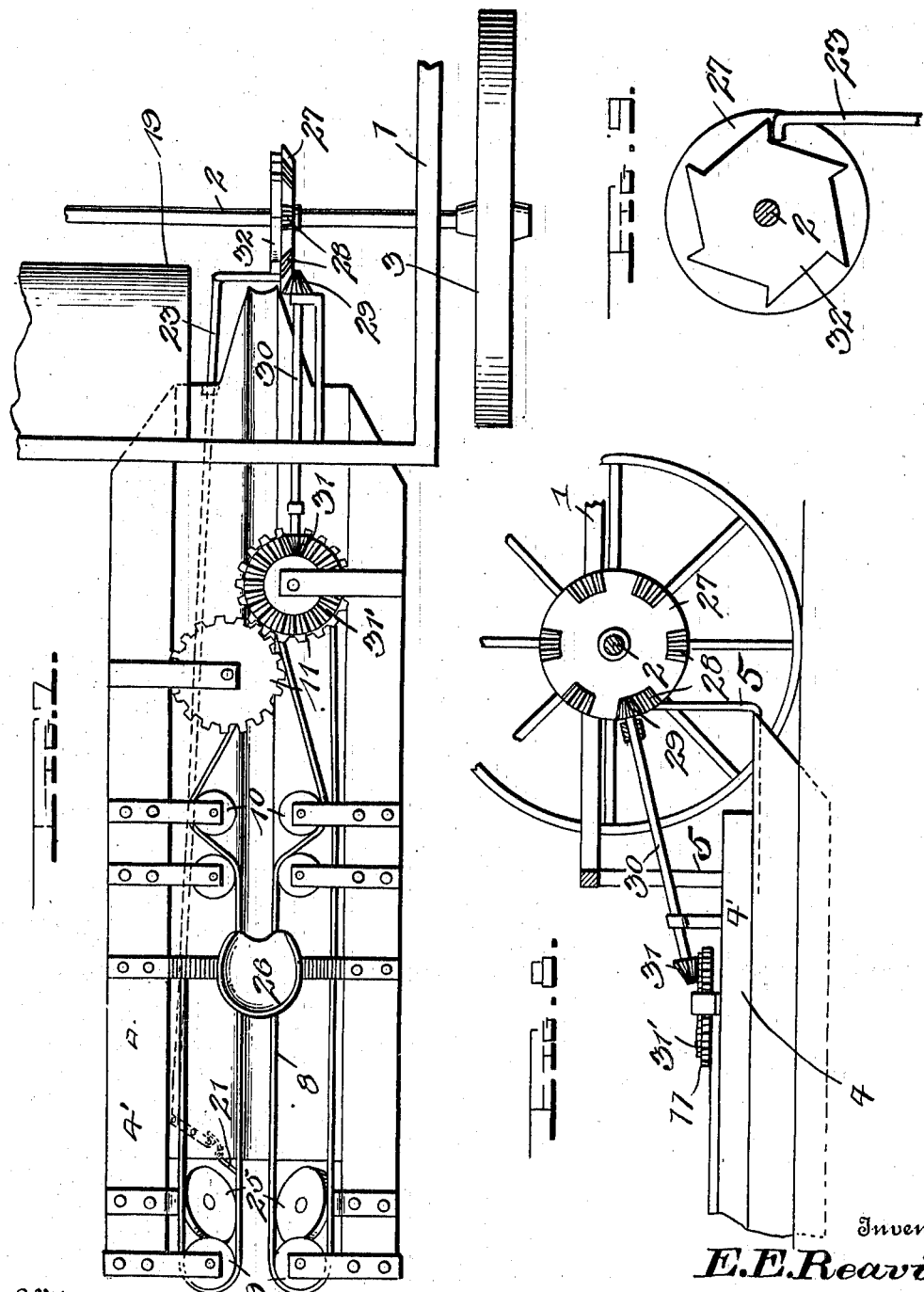

UNITED STATES PATENT OFFICE.

EDWIN E. REAVIS, OF SUMMITVILLE, INDIANA.

TRANSPLANTING-MACHINE.

1,059,316.     Specification of Letters Patent.     Patented Apr. 15, 1913.

Application filed October 12, 1912. Serial No. 725,485.

*To all whom it may concern:*

Be it known that I, EDWIN E. REAVIS, a citizen of the United States, residing at Summitville, in the county of Madison and State of Indiana, have invented certain new and useful Improvements in Transplanting-Machines, of which the following is a specification, reference being had to the accompanying drawings.

This invention relates to new and useful improvements in machines for the purpose of transplanting plants such as sweet potatoes, cabbage, tomatoes and plants of like nature, the object of the invention being to render the process more expeditious, accurate and successful, while at the same time greatly reducing the cost of the operation.

Another object of the invention is to provide an improved machine for setting plants which embodies novel means for handling the young plants whereby the same are dropped at the required intervals and set in perfectly straight rows which admit of subsequent close and quick cultivation.

A further object of the invention is to provide a transplanting machine of the above character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claims and shown in the accompanying drawings in which, Figure 1 is a side elevation of a machine constructed in accordance with my invention. Fig. 2 is a top plan view. Fig. 3 is a sectional view, taken on the line 3—3 of Fig. 2. Fig. 4 is a fragmentary top plan view, parts being broken away and in section. Fig. 5 is a sectional view taken on the line 5—5 of Fig. 2. Fig. 6 is a fragmentary detail perspective view of the operating rod. Fig. 7 is a top plan view of one of the runners illustrating a modified form of operating mechanism. Fig. 8 is a fragmentary side elevation of the modified form, and Fig. 9 is a side elevation of a ratchet illustrating the means for actuating the operating rod.

Referring more particularly to the drawings, 1 indicates the main frame of the device which is suitably mounted upon the axle 2 having the wheels 3 mounted upon each end thereof. Suspended from the frame at each end thereof is a shoe or runner 4 which is adapted to open a suitable furrow in the ground for the reception of the plants to be transplanted. These shoes or runners 4 comprise the longitudinal beams 4' which are suspended from the main frame 1 by means of the hangers 5. Secured to the under side of the beams is a V-shaped trough or channel 6 which is tapered at its forward end to form a suitable point adapted to engage in the soil to open a furrow.

Mounted upon the shoes or runners 4 are the drums 7 which are arranged in alternate spaced relation and upon which the conveyer belts 8 are mounted, the rear end of said conveyers being suitably mounted upon vertically disposed guide rollers 9 which are arranged in approximately close relation leaving only sufficient room for the young plants to pass therebetween. Arranged at the rear of the two drums 7 are the alternately arranged guide rollers 10 around which the conveyers 8 pass so as to bring the same close together at this point, the plants which are to be transplanted being passed between the conveyers so that they will be taken to the rear of the machine, passing through the channel and into the furrow formed by the shoe or runner 4.

Mounted upon the upper ends of the drums 7 are the gears 11 which are adapted to mesh so that the drums 7 will rotate in unison. Mounted upon the upper end of one of the drums 7 is a ratchet 12 upon which is mounted the pivoted lever 13 carrying a suitable pawl 14 adapted to engage with the ratchet wheel 12. The lever 13 is provided at its outer end with a pair of arms 15 adapted to be arranged upon each side of the check line 16 against which the stops 17 upon the check line are adapted to engage to rotate the wheel 12 which in turn will rotate the drum 7 and the conveyers 8. Arranged upon each side of the frame of the machine are the two guide rollers 18 around which the check line 16 passes so as to bring the same into engagement with the lever 13. In setting the new plants, the stops on the check line are arranged a sufficient distance apart so that when they engage the lever 13 they will move the lever far enough so that the plants which are carried by the conveyers will be dropped a certain distance apart, the distance between the plants being determined by setting the stops 17 the desired distance upon the check line 16. Mounted upon the frame is a suitable water tank 19 having a pipe 20 leading therefrom and terminating at the rear end of the machine where the plants are passed into the furrow. A pivoted valve 21 is arranged at the rear end of the pipe and adapted to be operated by a lever 22 which is connected to an operating rod 23 having a lug 24 formed therein and adapted to be engaged by the lever 13 to open and close the valve as each plant is deposited in the furrow.

Suspended from the rear of the platform 15 and arranged upon each side of the channel 6 are the rollers 25 which are adapted to press the dirt around the roots of the plant as each plant is passed into the furrow. It will be apparent that as each plant is passed into the furrow, the lever 13 engages the lug 24 upon the rod 23 so as to operate the valve 21 and open the same to allow a sufficient amount of water to be deposited around the plant so that the same will not wilt or die.

Mounted upon the frame and arranged above the water tank 19 is a suitable seat for the driver and mounted upon the frame and arranged above the shoes or runners 4 are suitable seats 26 for the operators who deposit the plants between the conveyer belts at the point A. The conveyer belts 8 remain stationary after the lever 13 has been pushed forward far enough to allow the stops 17 to pass over the same and the coil spring 26' has returned the lever to its normal position. When the conveyers 8 stop, the operator then places another plant between the conveyers at the point A and as the conveyers move rearwardly, a plant is deposited in the furrow at the rear end of the machine.

In using my improved machine for drilling in transplanting young plants, I provide a gear wheel 27 which is mounted upon the axle 2 and has a plurality of teeth formed in sets and arranged in spaced relation as illustrated at 28. A beveled gear 29 is adapted to mesh with the sets of teeth 28 upon the wheel 27 and is suitably connected by means of the shaft 30 to a second gear 31 which is adapted to mesh with the gear 31' formed on the gears 11 which are mounted upon the runners 4. Thus it will be apparent that upon the rotation of the wheel 27, the gear 29 will be rotated by means of the teeth 28, but as the gear passes between each set of teeth, the same will remain stationary allowing the conveyers 8 also to stop, signaling to the operator to place another plant between the conveyers. In this form of the invention, I provide a cam 32 which is formed upon the side of the wheel 27 opposite the teeth 28 and which is adapted to be engaged by the valve operating rod 23 so that as the plants are deposited within the furrow, the valve 21 will be operated to allow the water from the tank 19 to be deposited around the plants.

In the practical use of my improved transplanting machine, the conveyers 8 may be made of any suitable material and are to be faced with sheep skin or other suitable woolen material so as not to crush or otherwise injure the plants which are placed between the conveyers.

From the above description taken in connection with the accompanying drawings, it will be readily apparent that I have provided a simple and durable machine for setting plants, which embodies novel means for handling young plants whereby the same are dropped at the required intervals and set into perfectly straight rows.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the character described, comprising in combination a guide trough for plants open at its ends, means for intermittently moving the plants in said trough and ejecting the same from one end to deposit the plants in the furrow, and means coacting with the first means for watering each plant as the same is deposited in the furrow.

2. A device of the character described, comprising in combination a guide trough for plants, open at its ends, and means for intermittently moving the plants in said trough and ejecting the same from one end to deposit the plants in the furrow.

3. A device of the character described comprising in combination a hollow runner forming a trough and providing a guide way for the plants, means for intermittently moving the plants in said trough and ejecting the same from one end to deposit the plants in the furrow.

4. A device of the character described, comprising in combination a hollow runner forming a trough and providing a guide way for the plants, said runner having one end beveled off to engage in the ground and form a furrow, means for intermittently moving the plants in said trough and ejecting the same from one end to deposit the plants in the furrow and means co-acting with the first means for watering the roots of each plant as they are deposited in the furrow.

5. A device of the character described, comprising in combination a guide trough for the roots of the plants open at its ends, conveyer belts mounted upon each side of said trough and between which the tops of the plants are arranged, means for intermittently moving the conveyer belts and ejecting the plants from the end of the trough to deposit the same in the furrow, and means co-acting with the intermittent movement of the conveyer belts for watering the roots of each plant as they are deposited in the furrow.

6. In a device of the character described comprising in combination a guide trough for the roots of the plants open at its ends, alternately spaced drums mounted upon one end of the guide troughs, spaced rollers mounted upon the other end of the guide trough, conveyer belts mounted upon said drums and rollers and disposed upon opposite sides of the trough, gears mounted upon the upper ends of said drums and means for intermittently rotating the gears and moving the conveyer belts to eject the plants from the end of the trough to deposit the same in the furrow.

7. A device of the character described, comprising in combination a guide trough for the plants open at its ends, means for intermittently moving the plants in the trough and ejecting the same from one end to deposit the plants in the furrow, a water tank, a pipe leading from said tank to one end of the trough, a valve normally closing the end of said pipe, a lever connected to said valve, an operating rod connected to said lever, and means co-acting with the first means for operating said rod to open said valve as each plant is deposited in the furrow.

8. A device of the character described, comprising in combination a guide trough open at its ends, alternately arranged spaced drums mounted upon one end of the trough, spaced rollers mounted upon the other end of said trough, conveyer belts mounted upon said drums and rollers and disposed upon opposite sides of the trough, spaced guide rollers arranged upon opposite sides of the trough and disposed in the rear of said drums, said conveyer belts alternately passing around said guide rollers so as to bring the same close together at this point, and means for intermittently moving said conveyer belts to eject the plants from the end of the trough and deposit the same in the furrow.

9. A device of the character described, comprising in combination a guide trough for plants, open at its ends, alternately arranged spaced drums upon one end of the trough, spaced guide rollers upon the other end of said trough, conveyer belts mounted upon said drums and rollers, gears carried by said drums and adapted to mesh, a ratchet upon one of said gears, a lever having a pawl adapted to engage said ratchet and a check line provided with stops adapted to engage said lever to intermittently move the conveyer belts to eject the plants from the end of the trough and deposit the same in the furrow.

10. A device of the character described, comprising in combination a guide trough for plants, open at its ends, alternately arranged spaced drums upon one end of the trough, spaced guide rollers upon the other end of said trough, conveyer belts mounted upon said drums and rollers, gears carried by said drums and adapted to mesh, a ratchet upon one of said gears, a lever having a pawl adapted to engage said ratchet and a check line provided with stops adapted to engage said lever to intermittently move the conveyer belts to eject the plants from the end of the trough and deposit the same in the furrow, and means adapted to be operated by said lever for supplying water to each plant as the same is deposited in the furrow.

11. A device of the character described, comprising in combination a guide trough for plants, open at its ends, alternately arranged spaced drums mounted upon one end of the trough, spaced guide rollers mounted upon the other end of the trough, conveyer belts mounted upon said drums and rollers, gears carried by said drums and adapted to mesh, means for intermittently rotating said gears and moving the conveyer belts to eject the plants from the end of the trough and deposit the same in the furrow, a water tank, a pipe leading from said tank to one end of the trough, a valve closing the end of said pipe, a lever connected to said valve, an operating rod connected to said lever, and means co-acting with the intermittent movement of the conveyer belts for operating said rod to open said valve as each plant is deposited in the furrow.

12. A device of the character described, comprising in combination a guide trough for plants open at its ends, means for intermittently moving the plants in the trough and ejecting the same from one end to deposit the plants in the furrow, a water tank, a pipe leading from said tank to one end of the trough, a valve normally closing the end of said pipe, a lever connected to said valve, an operating rod connected to said lever, a pivoted operating lug formed upon said rod, a pivoted operating lever adapted to engage said lug, and a check line provided with stops and adapted to engage said lever to intermittently open and close said valve to water each plant, as the same is deposited in the furrow.

13. A device of the character described, comprising in combination a guide trough for plants open at its ends, alternately arranged spaced drums upon one end of the trough, spaced guide rollers upon the other end of the trough, conveyer belts upon said drums and rollers, gears carried by said drums and adapted to mesh, a ratchet carried by one of said gears, a lever having a pawl adapted to engage said ratchet, a water tank, a pipe leading from said tank to one end of the trough, a valve normally closing the end of said pipe, a lever connected to said valve, an operating rod connected to said lever, a lug formed on said rod and a check line provided with stops adapted to engage said lever to intermittently move said conveyer belts to eject the plants from the end of the trough and deposit the same in the furrow, said lever engaging the lug in the same operation to open and close said valve as each plant is deposited in the furrow.

14. A device of the character described, comprising in combination a hollow runner forming a trough and providing a guide way for plants, said runner having one end beveled off to engage in the ground and form a furrow, means for intermittently moving the plants in said trough and ejecting the same from one end and depositing the plants in the furrow, rollers suspended at the rear of said trough and adapted to press the dirt around the roots of each plant as they are deposited in the furrow.

15. A device of the character described, comprising in combination a guide trough for plants open at its ends and adapted to engage in the ground to form a furrow, means for intermittently moving the plants in said trough and ejecting the same from one end to deposit the plants in the furrow, rollers suspended at the rear of the trough and adapted to press the dirt around the roots of each plant as they are deposited in the furrow, and means co-acting with the first means for watering the roots of each plant as they are deposited in the furrow.

16. A device of the character described comprising in combination a guide trough for plants, means for intermittently moving the plants in said trough and ejecting the same from one end to deposit said plants in the furrow, and means co-acting with the first means for watering the roots of each plant as they are deposited in the furrow.

17. A device of the character described comprising in combination a hollow runner forming a guide trough for the plants, means for intermittently moving the plants in said trough and ejecting the same from one end to deposit said plants in the furrow and means co-acting with the first means for watering the roots of each plant as they are deposited in the furrow.

18. A device of the character described comprising in combination a guide trough, means for intermittently moving the plants in the trough and ejecting the same from one end to deposit said plants in the furrow, a water tank, a pipe leading from said tank to one end of the trough, and means co-acting with the first means for controlling the discharge of water from said pipe whereby the water will be intermittently discharged into the furrow upon the roots of each plant as they are deposited therein.

In testimony whereof I hereunto affix my signature in the presence of two witnesses.

EDWIN E. REAVIS.

Witnesses:
 J. M. KAUFMAN,
 J. N. GORDON.

---

Copies of this patent may be obtained for five cents each, by addressing the "Commissioner of Patents, Washington, D. C."